United States Patent [19]

Osepchuk et al.

[11] E Patent Number: Re. 32,664

[45] Reissued Date of Patent: May 10, 1988

[54] ENERGY SEAL FOR HIGH FREQUENCY ENERGY APPARATUS

[75] Inventors: John M. Osepchuk, Concord; James E. Simpson, Waltham, both of Mass.

[73] Assignee: Raytheon Company, Lexington, Mass.

[21] Appl. No.: 488,527

[22] Filed: Apr. 29, 1983

Related U.S. Patent Documents

Reissue of:

[64] Patent No.: 3,767,884
Issued: Oct. 23, 1973
Appl. No.: 203,227
Filed: Nov. 30, 1971

U.S. Applications:

[63] Continuation of Ser. No. 582,324, May 3, 1975, abandoned.

[51] Int. Cl.[4] ..... H05B 6/76

[52] U.S. Cl. ..... 219/10.55 D; 174/35 R

[58] Field of Search ..... 219/10.55 D, 10.55 A, 219/10.55 F, 10.55 R; 333/248, 251, 254–261, 228, 233, 12; 174/35 R, 35 MS, 35 GC

[56] References Cited

U.S. PATENT DOCUMENTS

| | | | |
|---|---|---|---|
| 3,448,232 | 6/1969 | Kluck | 219/10.55 |
| 3,511,959 | 5/1970 | White | 219/10.55 |
| 3,584,177 | 6/1971 | Bucksbaum | 219/10.55 D |
| 3,662,140 | 5/1972 | Jones et al. | 219/10.55 |

FOREIGN PATENT DOCUMENTS 1022103 of 1966 United Kingdom .

OTHER PUBLICATIONS

Tomiyasu and Bolus "Characteristics of a New Serrated Choke", *IRE Transactions-Microwave Theory and Techniques*, pp. 33–36, Jan. 1956.

*Primary Examiner*—Philip H. Leung
*Attorney, Agent, or Firm*—William R. Clark; Richard M. Sharkansky

[57] ABSTRACT

A high frequency oven having a door sealed to the oven by a seal which prevents the escape of high frequency energy between the door and the oven by acting as a choke to energy attempting to pass across the seal in which excitation of energy modes in a band of frequencies including the desired operating frequency range of the oven is controlled peripherally along the seal. An energy absorbing gasket surrounds the seal to absorb any energy passing outwardly from the energy seal.

• • • • •

The questions raised in reexamination request No. 90/000,945, filed Jan. 29, 1986, have been considered and the results thereof are reflected in this reissue patent which constitutes the reexamination certificate required by 35 U.S.C. 307 as provided in 37 CFR 1.570(e).

92 Claims, 9 Drawing Sheets

ELECTRICAL CIRCUITS AND CONTROLS
16
3
38
30
34
32
31
18
64
36
48
Y
60
X
40
12
17
61
47
44
42
66
52
63
62
76
14
4

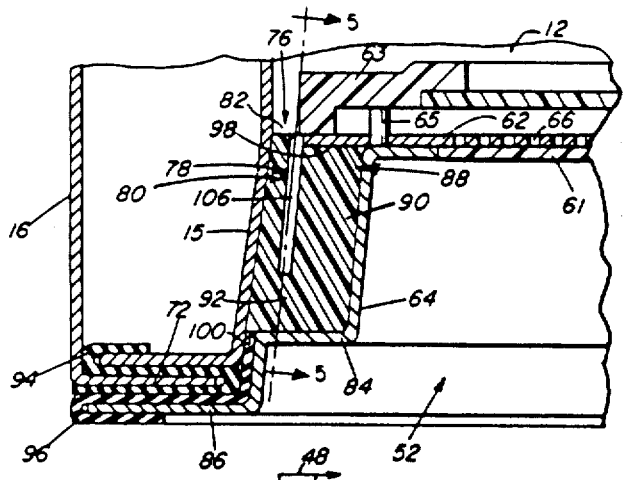
FIG. 4
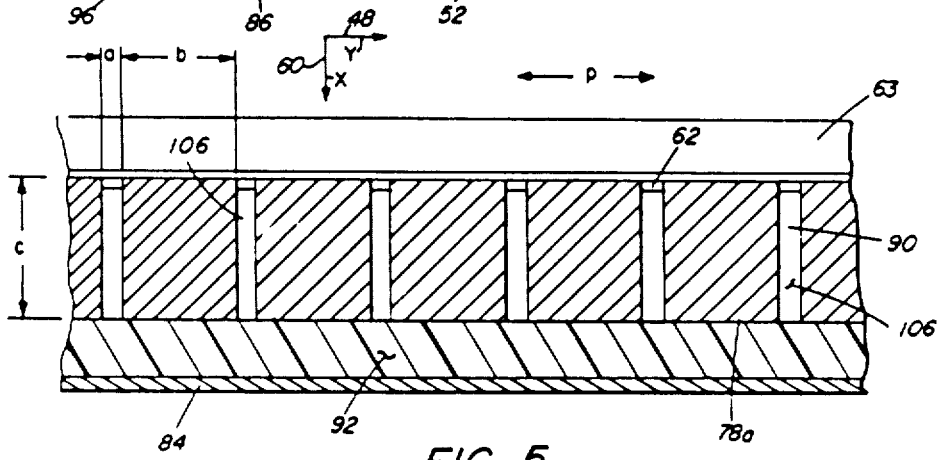
FIG. 5
FIG. 11
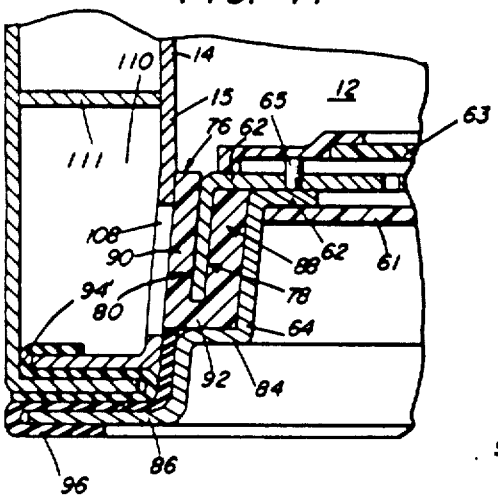
FIG. 12
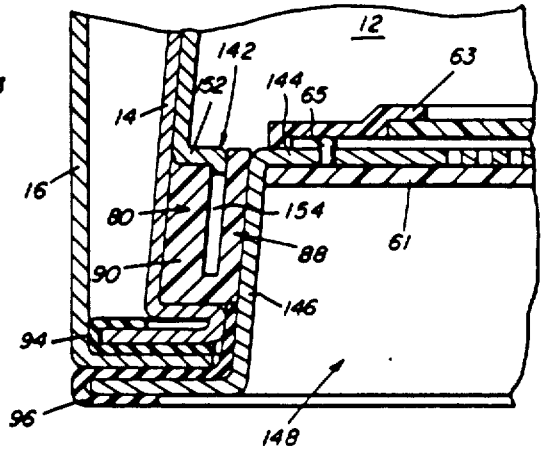

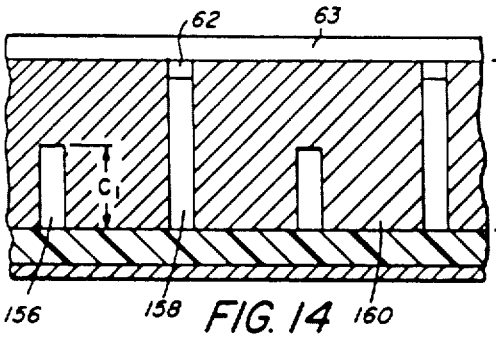
FIG. 14
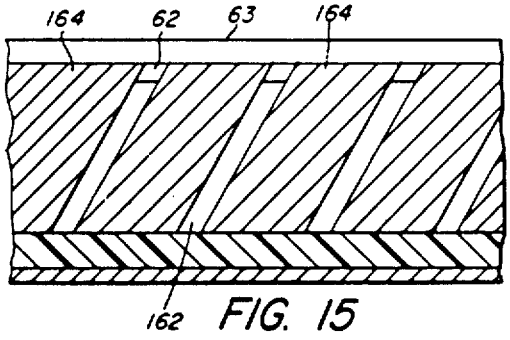
FIG. 15
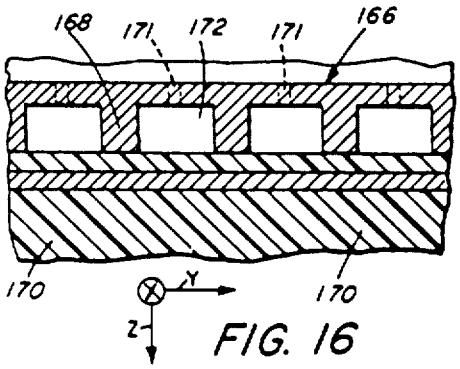
FIG. 16
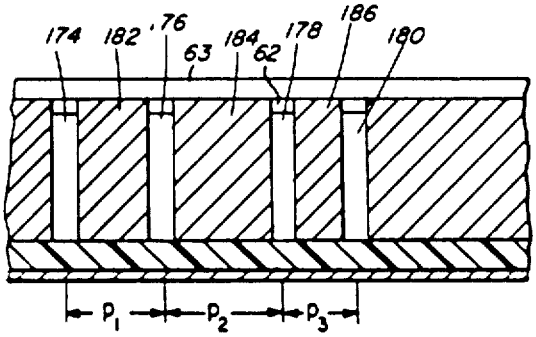
FIG. 17
FIG. 18
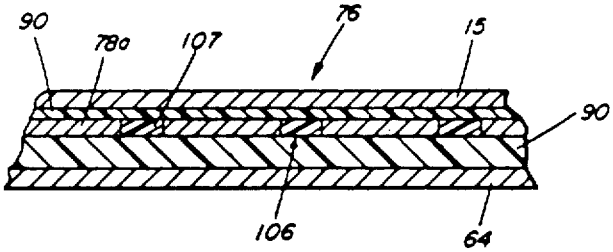
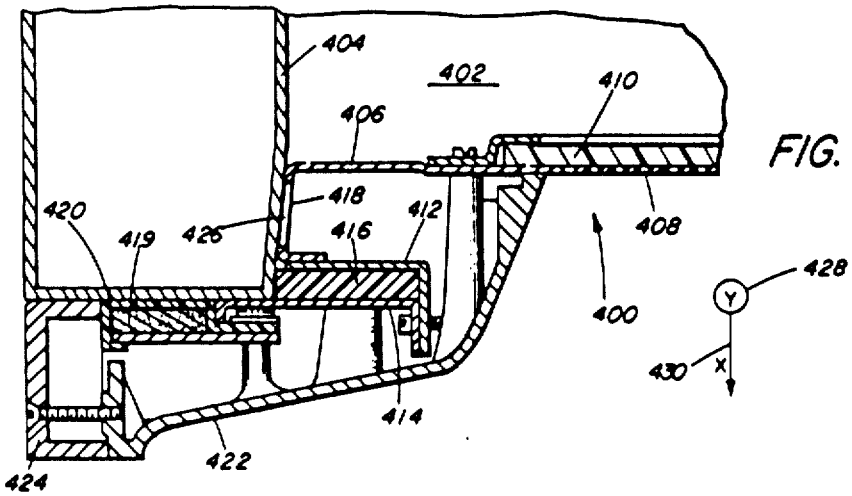
FIG. 13

ENERGY SEAL FOR HIGH FREQUENCY ENERGY APPARATUS

Matter enclosed in heavy brackets [ ] appears in the original patent but forms no part of this reissue specification; matter printed in italics indicates the additions made by reissue.

*This is a file wrapper continuation of application Ser. No. 05/582,324 filed May 30, 1975 which is a reissue of U.S. Pat. No. 3,707,884.*

BACKGROUND OF THE INVENTION

The invention relates to electromagnetic energy supporting structures and more particularly to microwave heating apparatus having energy seals to prevent the leakage of such energy from the apparatus. In the microwave oven art the escape of high frequency energy from an oven cavity is desirably controlled in order to comply with standards established by State and Federal regulatory agencies and bodies, such as the Department of Health, Education and Welfare, Federal Communication Commission, and The United States of America Standards Institute. Conventionally, such apparatus operates at assigned frequencies of either 915 or 2,450 MHz and the term "microwave" as used in this description of the invention is intended to refer to that portion of the electromagnetic energy spectrum having wavelengths in the order of 1 meter to one millimeter and frequencies in excess of 300 MHz.

In microwave ovens the energy fed to the oven interior preferably resonates in a plurality of modes achieved by suitable adjustment of the oven dimensions. Such resonant modes are loaded by absorption of heat by the article being heated, and such absorption varies with the absorbing characteristics of the article as well as its size and shape. To assure uniformity of heating it has generally been desirable to cyclically vary the mode pattern with respect to the article by, for example, a mechanical mode stirrer, by movement of the article within the oven, by varying the frequency of the energy fed to the enclosure, and/or combinations of all the foregoing. The multiplicity of modes which vary with the loading within the oven and with the cyclical variation of the modes therein can result in excitation of modes within a door seal which have propagating components along the seal and can produce undesirably large amounts of energy leakage through the door seal.

In the prior art numerous energy seals have evolved including those providing metal-to-metal contacting surfaces or interdigital structures, such as, for example, the embodiments referred to in U.S. Pat. Nos. 2,956,143 issued to L.H. Shall on Oct. 11, 1960, 2,958,754 issued to D.E. Hahn on Nov. 1, 1960, as well as 3,448,232 issued to J.H. Kluck on June 3, 1969. Among the disadvantages with such structures is the mechanical variations which over a period of time develop gaps with substantial energy leakage. It is also inherent in such structures and, in particular, the last named structure that propagation of energy in all modes and in all directions along the energy seal must be suppressed by substantially complete metal-to-metal contact in order for the seal to be effective. Additionally, with the establishment of gaps over periods of time between the contacting metal surfaces high frequency energy arcing may occur during operation and/or upon opening of the door.

Other prior art energy seals include electrical choke arrangements together with dielectric bodies to define paths of least resistance for energy leaking along the peripheral gap defined between the door and access opening walls of an oven. Several examples of choke energy seals are illustrated in U.S. Pat. Nos. 3,182,169 issued to Richard Ironfield on May 4, 1965, and 3,584,177 issued to Arnold M. Bucksbaum on June 8, 1971. The choke type energy seals are intended to handle single energy propagating modes and have, for example, a dimension of one-quarter of a wavelength of the operating frequency of a TEM-mode along a first path with a total excursion of one-half a wavelength from a short circuit defined by a terminating wall which is reflected back to the point of origin of the escaping energy through the peripheral gap.

In previous embodiments such choke arrangements in the course of time may change their electrical characteristics due to mechanical wear and buildup of food particles which alters the door dimensions and hinders the effectiveness of the choke in preventing leakage. As a result, heating apparatus which initially meets the low radiation standard levels after installation may significantly drift from such levels. It has further been noted that with the excitation of plural modes within the oven cavity the region defined by the peripheral gap around the access opening becomes an efficient propagating structure for, particularly, modes propagating in a y-direction peripherally around the gap, as well as such energy modes intended to be directed across the energy seal, hereinafter referred to as the x-direction, to encounter the choke arrangement. A wide range of higher-order modes can be initiated which propagate in the x-direction having wavelengths greatly different than the operating frequency wavelength because these modes are associated with cutoff resonance of y-propagating modes at frequencies close to the operating frequency.

In attempting to understand the electrical characteristics of the undesired modes propagating peripherally along the energy seal associated with the x-directed modes a study of the longitudinal and transverse current flows has indicated that energy seals, particularly those with choke arrangements, exhibit large quasi-periodic variations of leakage superimposed upon or even counteracting the expected TEM-mode suppression characteristics of the choke. Energy absorbing bodies, such as gaskets, are, therefore, coupled just beyond or outside the mode supporting energy seals in order to further dissipate energy leakage and assure maintenance of the standards. If the dielectric bodies within the choke or the energy absorbing bodies do not have stable dimensions and locations during the operation of the oven apparatus or if the door location and centering varies then excessive energy leakage and gasket heating will occur in an uncontrollable manner. A need arises, therefore, for an improved high frequency energy apparatus having an energy seal which will provide for controlled energy mode propagation in one direction by inhibiting the initiation of modes which can propagate in a different direction.

SUMMARY OF THE INVENTION

The present invention provides for an electromagnetic energy mode supporting structure having means for controlling undesired propagation modes. More specifically, means are provided defining an energy propagation path with energy being propagated in one direction but prevented from propagating in a different direction. As used throughout the specification and claims, the term "mode" means a state of electromagnetic wave energy characterized by a particular distribution in space and time. The term "propagation" is intended to mean energization with an electromagnetic wave having a real phase velocity and is further intended to include standing and/or non-standing waves. The term "real" relating to the phase velocity is intended to refer to a wave which is not cut off from propagating and is capable of propagating without substantially decaying.

The invention further provides that such a mode supporting structure can be used to prevent the escape of energy around the peripheral gap of an oven door. Such an improved energy seal is preferably positioned adjacent to at least one of the peripheral walls adjacent to the opening. The mode supporting structure is provided with circuit parameter variations along at least a portion of the structure such that the parameters have maximum and minimum points spaced apart less than one effective electrical wavelength at the operating frequency. The term "circuit parameter," as used herein in the specification and claims, means any of those circuit elements or waveguide constants which are dependent on geometry and/or material which in a generalized transmission line mode affects the characteristics of propagation of standing electromagnetic wave in a structure.

One wall of such a mode supporting structure is movable with respect to an opposing wall when the door is opened. To inhibit the excitation of modes propagating in the longitudinal or peripheral direction around the access opening, periodic and/or aperiodic spaced structures such as slots are provided which yield stop bands of frequencies which prevent resonances close to an operating frequency. The absence of such resonances results in the absence of modes propagating transverse or across the mode supporting structure with cutoff resonant frequencies close to the operating frequency. This then further results in the restriction of guided wavelength values of all modes propagating in the transverse direction to values close to a single value. Such circuit parameter variations may be provided in at least one of the walls of the mode supporting structure formed by the door or, alternatively in at least a portion of the access opening walls.

The invention further provides for the use of an elongated energy seal in heating apparatus to prevent substantial leakage of energy from the access aperture used to introduce material to be heated into the oven enclosure. By inhibiting the propagation of energy along the energy seal and thereby restricting propagation to a direction across such structure, an electrical choke may be constructed which reflects substantially all of the energy entering through the peripheral gap and substantially reduces or eliminates the need for energy absorbing bodies at the primary operating frequency of the oven surrounding the door. The reduction of the absorption requirements of the energy absorbing bodies permits such bodies to be used effectively to absorb any harmonics of the operating frequency which may be inadvertently generated by the source of energy.

The invention may be utilized in numerous other electromagnetic energy apparatus and systems where control of propagation of energy modes is required for efficient operation.

BRIEF DESCRIPTION OF THE DRAWINGS

Details of illustrative embodiments of the invention will be readily understood after consideration of the following description and reference to the accompanying drawings, wherein:

FIG. 4 is an enlargement of a detail of the cross-sectional view of FIG. 2 illustrating a portion of the choke-type door seal arrangement in said embodiment taken along the line 4—4 in FIG. 2;

FIG. 5 is a cross-sectional view of the detail of FIG. 4 taken along the line 5—5 in FIG. 4;

FIG. 11 is a partial cross-sectional view of an alternative embodiment of the invention for choke-type door seal arrangements;

FIG. 12 is a partial cross-sectional view of still another alternative choke-type door seal arrangement embodying the invention;

FIG. 13 is a partial cross-sectional view of an alternative choke arrangement;

FIG. 14 is a partial cross-sectional view of an alternative mode supporting structure embodying the invention;

FIG. 15 is a cross-sectional view of another structure embodying oblique circuit parameter variation means;

FIG. 16 is a partial cross-sectional view of another embodiment of the invention providing corrugated circuit parameter variation means;

FIG. 17 is a partial cross-sectional view of an aperiodically structure embodying the invention;

FIG. 18 is a partial cross-sectional view of another embodiment of the invention;

DESCRIPTION OF THE PREFERRED EMBODIMENTS

Figure 1:
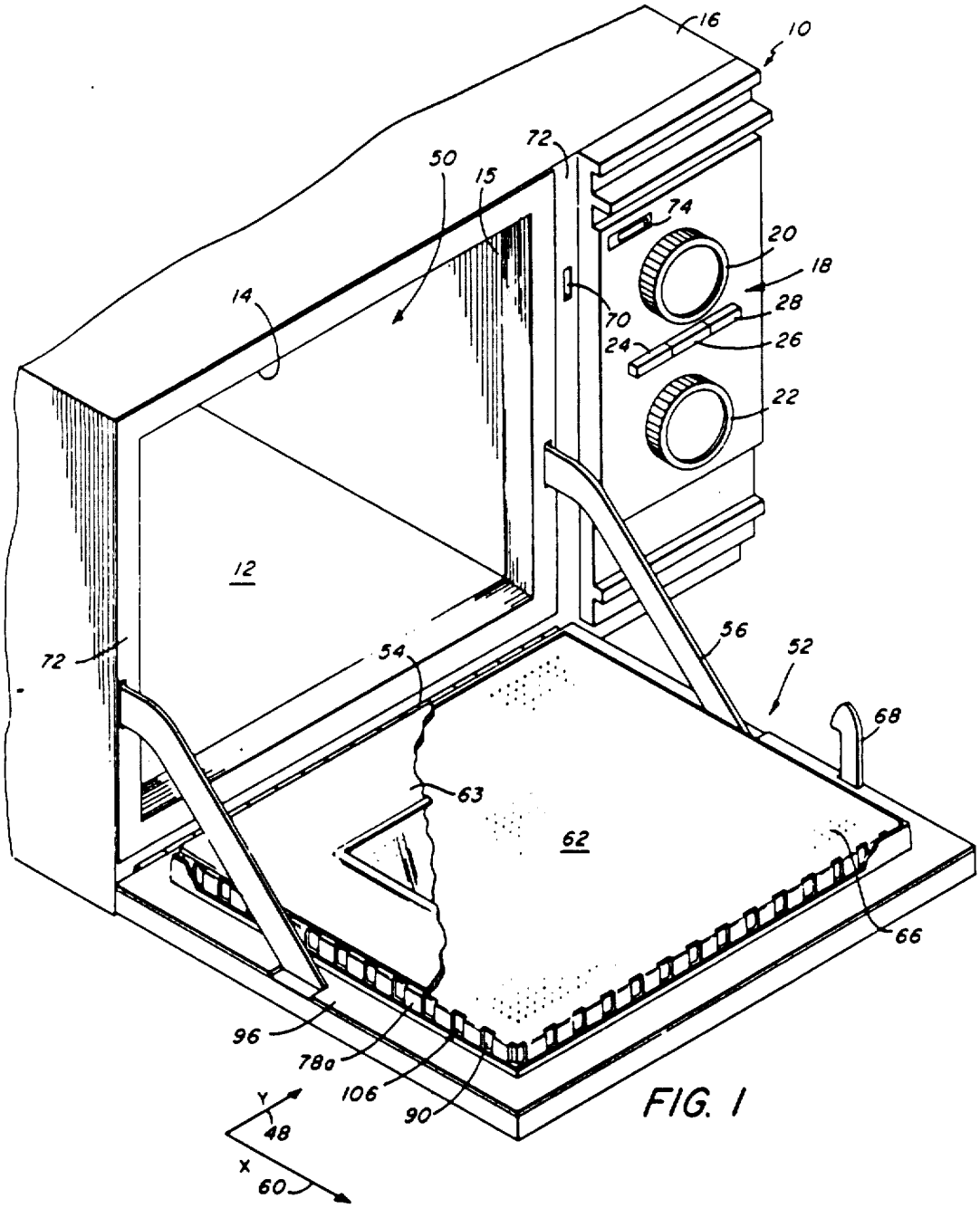
FIG. 1 is a perspective view, partially broken away, of a portion of an oven and control system embodying the invention.
Figure 2:
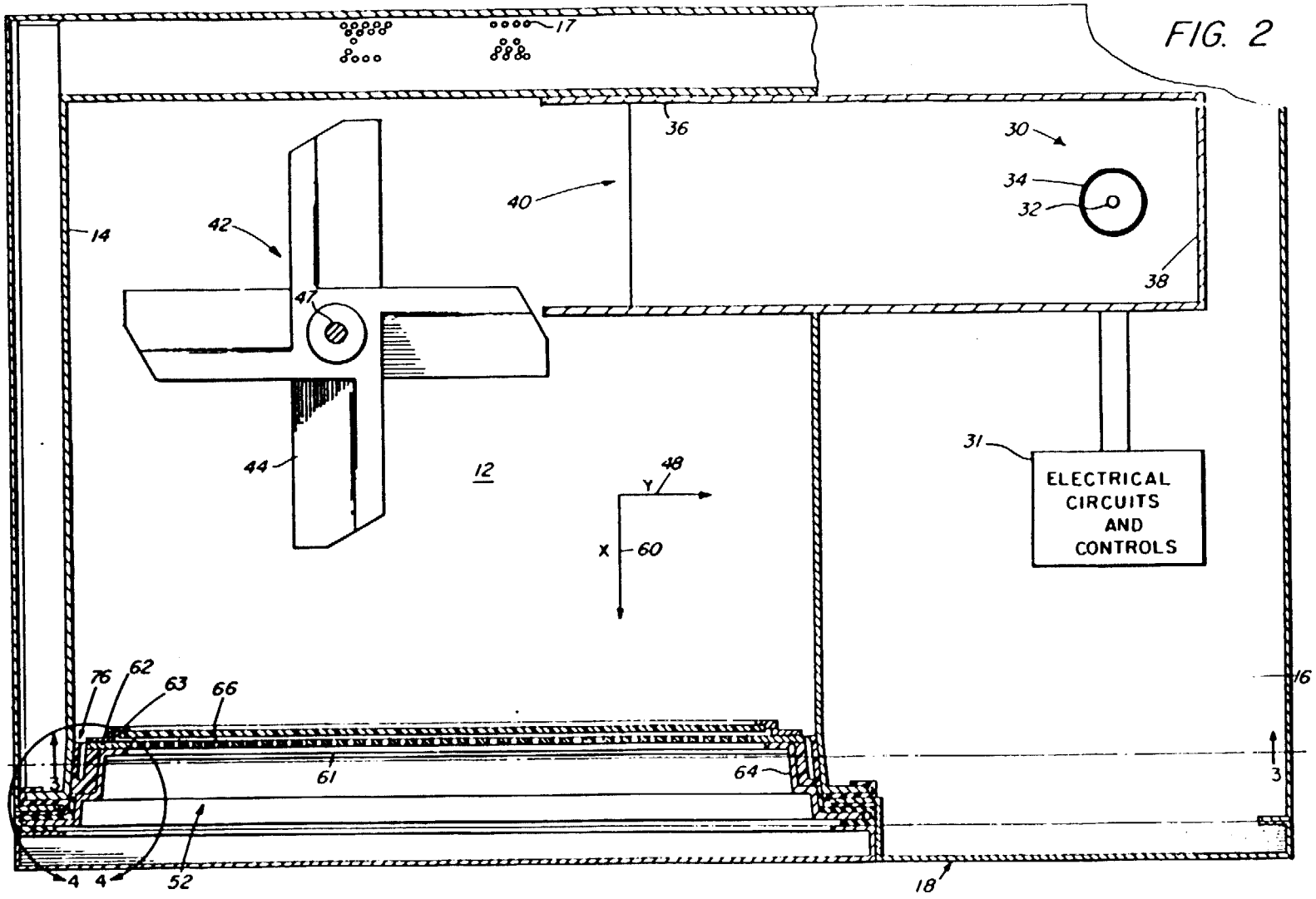
FIG. 2 is a longitudinal cross-sectional view of the oven portion of the embodiment of the invention illustrated in FIG. 1 taken along the line 2—2 in FIG. 3.
Figure 3:
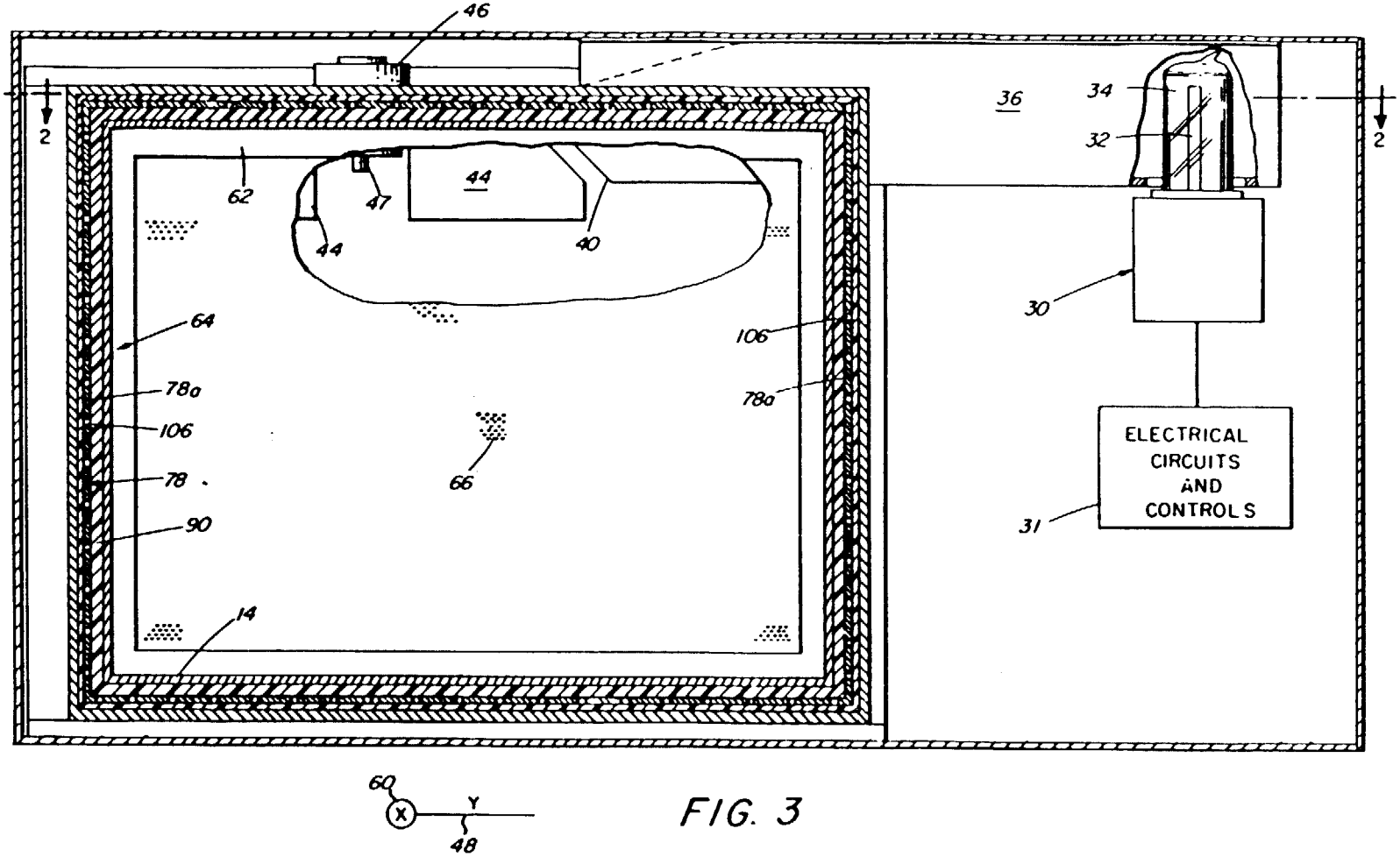
FIG. 3 is a partially broken away cross-sectional view of said embodiment taken on the line 3—3 in FIG. 2.

Referring now to FIGS. 1-5 inclusive, the heating apparatus 10 embodying the features of the invention is of the drop-down door type comprising a hollow cavity enclosure 12 defined by conductive walls 14. A case member 16 surrounds the enclosure as well as the accompanying microwave energy generator, electrical circuits and controls. A control panel 18 supports a 5-minute timer switch 20 as well as a 30-minute timer switch 22. A start control button 24, stop control button 26 and light control button 28 are also mounted on panel 18. An upper wall member 14 is provided with perforations 17 to facilitate the removal of any heat within the cavity enclosure.

A source of electromagnetic energy, such as a magnetron type oscillator 30, is coupled to the high voltage supply circuits and electrical controls indicated generally by box 31. The energy is fed by means of antenna 32 mounted within a dielectric dome member 34 into a launching waveguide section 36 adapted to transmit energy to the enclosure at the frequency of desirably 2,450 MHz in principally the TEM mode. The waveguide section is short-circuited at one end by wall member 38 with the opposing end 40 being tapered and open. The energy is distributed in a cyclically varying manner to produce a plurality of modes within the enclosure by, for example, a mode stirrer 42 having a plurality of paddle members 44 actuated by a motor 46 connected to shaft 47. Such mode stirrers provide for the excitation of numerous modes at random as well as planned orientations within the enclosure 12. The energy mode distributions have varied patterns and the oven cavity is dimensioned to be substantially greater than an effective electrical wavelength of the predetermined frequency, for example, 2,450 MHz. The items to be heated are supported within the enclosure 12 by any suitable means such as, for example, a tray of a dielectric material.

Access to the interior of the conductive enclosure 12 is provided by means of opening 50 closed by means of door assembly 52. In the drop-down model a bottom hinge 54 is provided and the movement of the door assembly is controlled by a pair of spring tension counterbalanced arms 56. Safety interlock switches are contacted by arms 56 and are housed adjacent to walls 14.

Door assembly 52 comprises a panel member 62 and ring member 64 secured together by any conventional means to form a unitary assembly to be described. Perforations 66 in metal panel member 62 allow visual observation of the oven interior during cooking while preventing the escape of any electromagnetic energy radiated within the enclosure. An outer window member 61 is supported within ring 64. An inner window assembly 63 with a transparent region also renders the perforations inaccessible to damage and simplifies cleaning of the oven interior. A stud 65 secured to member 63 is press-fitted into apertures in panel member 62. Window member 61 is retained in position by adhesive means as well as door trim members omitted from this view for the sake of clarity. A latch 68 is pivotally mounted on the door assembly 52 and engages a mating slot 70 in the peripheral front wall 72 surrounding the access opening. A mechanically actuated latch locking arrangement 74 is slidably disposed within the control panel 18 and is coupled to an interlock switch to prevent opening of the door after the apparatus is operative.

A door-type electrical choke arrangement 76 extends around the periphery of the door to form an elongated seal, a portion of which is mounted on the door assembly with the wall members having a slightly tapered configuration to mate with the tapered walls 15 of the conductive walls 14 to assure a snug fit after closing. Referring now to FIGS. 4 and 5 an enlarged view of the choke arrangement is shown. Panel member 62 defines a peripheral common wall section 78 which defines with the opposing tapered conductive wall 15 an elongated electromagnetic energy path 80 extending peripherally around the opening 50. The point of origin of the energy is indicated at the gap 82. Ring member 64 has a substantial step configuration to provide a conductive wall surface 84 forming a part of the choke arrangement as well as a front lateral member 86 overlapping the casing 16 opposite to the peripheral walls 72. The door assembly is fabricated by welding or riveting or any of the well-known metal fabrication techniques for securing the abutting surfaces. Ring member 64 defines with common wall section 78 a second electromagnetic energy path 88 for any energy escaping through the peripheral gap 82. The parallel paths 80 and 88 may be filled with a dielectric material, such as a body 90 of polystyrene or polypropylene. The entrance and exit to the choke cavity path 88 is provided by the gap 92 defined between the end of the wall section 78 and the opposing wall 84. The foregoing arrangement is an efficient high frequency energy seal which offers a path of least resistance for any escaping energy around the peripheral gap 82.

In addition to the energy seal, elongated energy absorbing bodies 94 and 96 may be disposed as shown between the wall surface 86 of the door ring member 64 and the peripheral wall surfaces 72. Bodies 94 and 96 may be of any desired material for absorbing electromagnetic energy passing through the choke arrangement 76 including rubber or plastic materials loaded with carbon derivatives or ferrite materials and the like and may be secured to the metallic walls by suitable adhesive materials. Such an energy absorbing seal also absorbs any frequency harmonics of the primary frequencies (2,400–2,500 MHz) which may be generated by the magnetron.

In accordance with the principles of energy transmission such electrical choke arrangements are provided with wall portions defining paths 80 and 88 selected primarily to provide a high series reactance at the choke opening and to reflect a short circuit from a terminating wall surface 98 to the energy directed through gap 82. The choke dimensions are typically selected to provide a short circuit at the point of origin of the escaping energy or approximately one-half a wavelength of the operating frequency. It has been observed, however, in previous embodiments that energy may be transmitted along the seal in the y-direction as indicated by the arrow 48 peripherally in the direction of the elongated path around the access opening. Such y-directed energy may have modes and/or wavelengths at the operating frequency differing from the desired wavelength and mode of the energy propagating across the seal at said frequency in the x-direction as indicated by arrow 60. These modes and, particularly, certain higher-order modes may have cutoff resonant frequencies close to the operating frequency.

In accordance with the teachings of the invention a plurality of spaced circuit parameter variations are provided by such means as capacitive slots 106 in at least one of the choke wall sections 78 to define therebetween substantially finger-like conductive members 78a. Substantial variations in the circuit parameters of the mode supporting structure results with alternate maximum and minimum points of such parameters. The distance between the points of maximum and adjacent points of minimum variation is less than one effective electrical wavelength of the frequency of excitation within the oven enclosure. The illustrated slots have a major dimension extending in the x-direction and, therefore, at an angle to the y-direction or peripheral direction of the mode supporting choke seal structure. The underlying dielectric material 90 within the choke structure path 88 is thereby exposed to energy propagating across the elongated peripheral gap in the x-direction while the slots 106 act as open circuits to establish stop bands which inhibit initiation of energy mode propagation in the y-direction.

The circuit parameter variations may be provided in a periodic or aperiodic manner or combination of both and the distances between the slots will provide any series of high reactances as long as the dimensions of the period are less than one effective wavelength of the energy at the given frequency within the enclosure 12 preferably, substantially less than one-half of the wavelength of the operating frequency. Referring particularly to FIG. 5 it will be noted that the slots 106 provide alternate finger-like conductive member 78a. The width dimension "a" of the slots should be great enough to present a low value of capacitance to energy propagating across the elongated mode supporting structure in the x-direction. If the slot width is excessive direct coupling between the energy in the oven enclosure and the choke path 88 will occur. Dimension "b" is desirably less than one electrical wavelength including the effects of the dielectric loading present. The length of the slots 106, dimension "c", or the major dimension extending normal to the direction of modes to be inhibited in exemplary embodiments was close to one-quarter of a wavelength including the effects of junction susceptance. In the illustration, therefore, the slot dimension "c" is substantially the full length of the choke wall section 78. Alternatively, the slot may terminate a short distance from the edge of panel member 62. The slots 106 have been illustrated as being void of any medium other than air, however, in certain applications it may be desirable to fill the slots with dielectric medium similar to that employed for the body member 90 disposed within paths 80 and 88.

Figure 6:
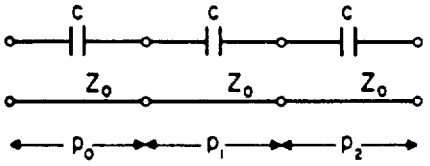
FIG. 6 is a schematic representation of the equivalent circuit of the embodiment of the invention shown in FIGS. 1-5.

While the reasons for the successful operation of the invention are not thoroughly comprehended certain general principles apply to structures having the elongated geometry of a typical heating apparatus door assembly or any large waveguide structures capable of supporting numerous propagating modes by referring first to the schematic representation of the equivalent circuit depicted in FIG. 6. The series of periodic or aperiodic variations in the form of capacitance reactances are spaced a distance p with each slot having a capacitive value C to load a mode supporting structure having a characteristic impedance Zo. Although the peripheral gap under consideration is reentrant, the structure may be considered for the sake of simplicity as being infinite in length in order to analytically deduce certain theoretical principles which will assist in an understanding of the invention.

Figure 7:
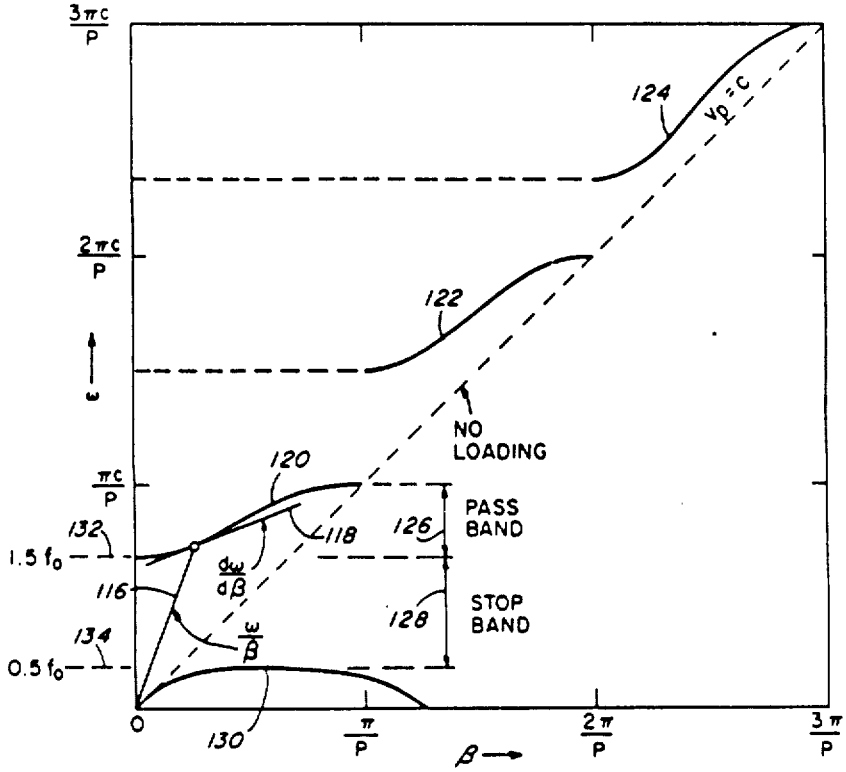
FIG. 7 is a diagram illustrating the $\omega$-$\beta$ characteristics for a mode supporting structure having means for variation of the circuit parameters.

Referring now to FIG. 7 the frequency characteristics of an infinite capacitively loaded structure are plotted in terms of frequency $\omega$ and the propagation constant $\beta$. In addition to the TEM-like modes within the path 80 in the x-direction a number of possible modes in which the guided wavelength $\lambda g/\lambda$ is considerably different than unity can be studied utilizing the principles of quasi or modified periodic structures. The phase change across the capacitor C is such that phase velocity varies to establish a series of stop and pass bands. Certain modes, therefore, can be determined to have an $\omega/\beta$ relationship for propagating in the y-direction indicated by line 116 and a slope characteristic $d\omega/d\beta$ shown by line 118 for curves 120, 122 and 124. Considering Maxwell's theory together with Floquet's theorem which states that for a given mode of oscillation in frequency the propagation wave function is multiplied by a constant complex factor on moving along the structure by one section or period, the cutoff frequencies for energy propagating along the y-direction may be determined.

The analysis provides the realization that pass band 126 exists to support desired energy transfer. A stop band also exists as indicated by line 128 in a certain frequency range preventing energy transfer. In addition to the higher-order modes certain lower frequency modes may also be supported within a mode supporting structure as indicated by curve 130. If a mode supporting structure is provided along the y-direction with circuit parameter variations which will substantially eliminate cutoff resonances composed of y-directed energy, then any modes with cutoff frequencies for propagation in the x-direction close to the operating frequency will be inhibited. Energy modes can then propagate in the x-direction with $\lambda g \sim \lambda$. Whereas previously some higher-order modes would have propagated in the x-direction close to the operating frequency, now these modes can initiate only reactive or evanescent penetration along the x-direction with insignificant coupling of the oven enclosure fields to external space through the gap region.

The invention teaches the establishment of such circuit parameter varying means to inhibit the initiation of modes propagating in the peripheral or y-direction by providing a stop band free of cutoff resonances close to the operating frequency $f_o$. The range of between 0.5 and 1.5 of the operating frequency, indicated between the dotted lines 132 and 134 in FIG. 7, has an approximate three-fold range to yield very effective inhibition of modes in the y-direction.

Classical periodic structure theory, for example enumerated in the text "Microwave Engineering" by Harvey, Academic Press, New York and London, at p. 436, yields the following equation for the propagation constant $\beta$ of energy in the peripheral or y-direction:

$$\cos \beta p = \cos \beta_o p + j\omega C Z_o \sin \beta_o p \qquad (1)$$

where $\beta_o = 2\pi/\lambda$ is the propagation constant of the energy in the mode supporting structure having an electrical wavelength including the effect of dielectric loading. Zo is the characteristic impedance and "p" is the spacing between consecutive capacitances C. The upper edge of the stop band can be made close to $\beta_o p \sim \pi$ if $\omega CZo$ is substantially small, for example, $\omega CZo << 1$. If the stop band is made to be at least twice $2f_o$ then there can be no cutoff resonance in the y-direction for x-propagating modes at all frequencies below $2f_o$. The essential condition for the inhibition of higher-order mode propagation is, therefore, fulfilled by selecting a slot width to yield a low capacitance C and a small period p. In actual embodiments operating at 2,450 MHz a "p" dimension in the range of 0.650–0.750 inches and an "a" slot dimension in the range 0.070–0.125 inches provided desired propagation characteristics.

Figure 8:
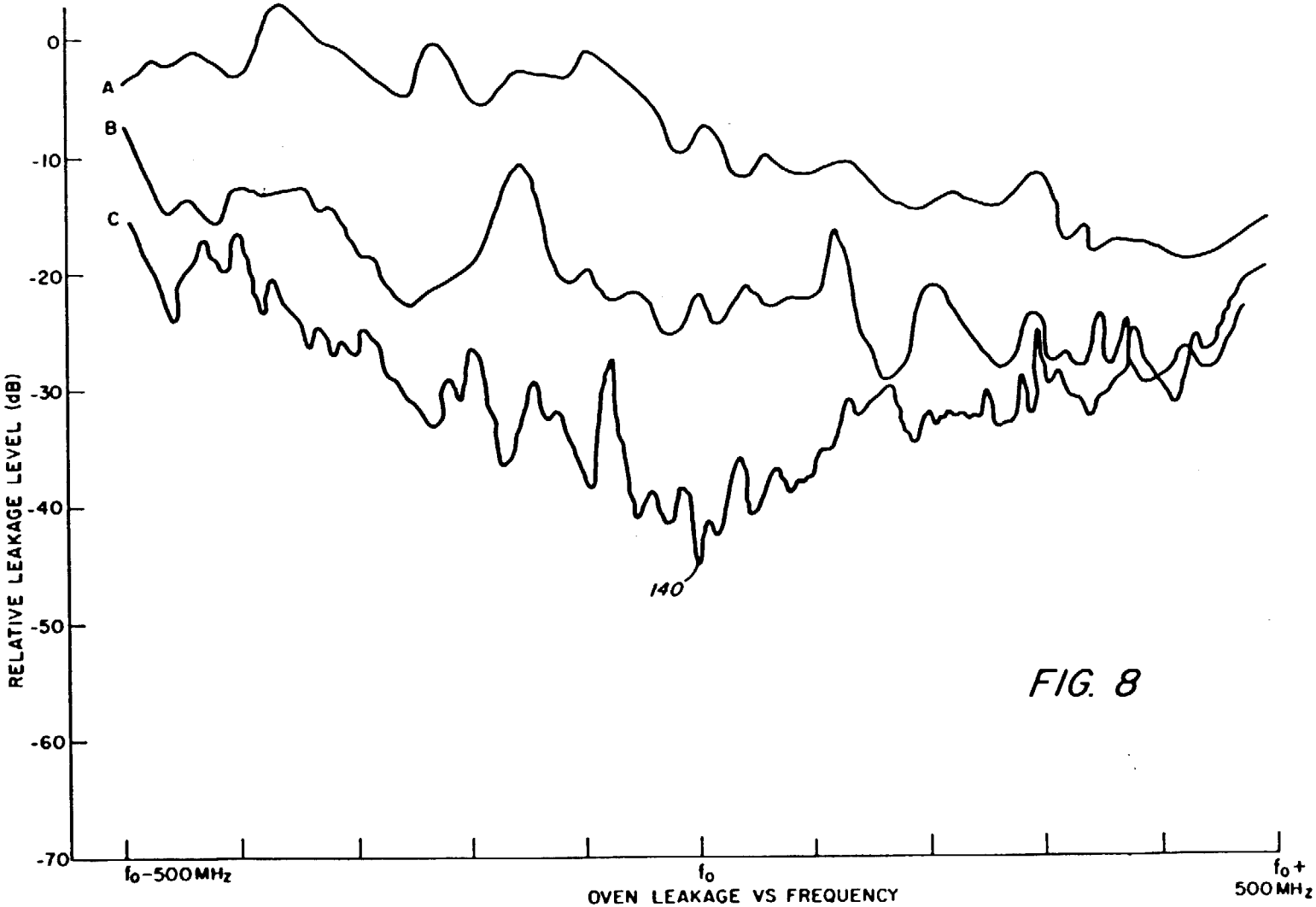
FIG. 8 is a plot of the curves of energy leakage versus frequency measurements of modified and unmodified heating apparatus.

Before proceeding to a description of numerous other embodiments of periodically or aperiodically circuit parameter variations the performance measurements of oven leakage versus frequency illustrated in FIG. 8 will now be described. The illustrative curves represent a large number of readings taken at numerous locations around the periphery of the energy seal with a large number of curves superimposed and the maximum envelope taken as the curve of maximum leakage versus frequency for each particular combination. Curve A represents a microwave oven door seal without any electrical choke arrangements or modifications. Curve B represents an oven door assembly with just a choke. Curve C represents a door assembly modified in accordance with the invention by capacitive slots having widths in the range of 0.070–0.125 inches and a spacing "p" in the range 0.650–0.750 inches together with an electrical choke arrangement. All three curves reflect results without the use of any secondary lossy or damping gaskets, as well as plastic materials covering the perforations in the door. The frequency $f_o$ is the assigned operating frequency of microwave oven apparatus.

Curve A without any protection indicates a high level of leakage which decreases with frequency according to theoretically confirmed variation of input reflection. A choke arrangement indicated by curve B reduces the leakage by about 10–20dB with no distinct choke resonance indicated in the vicinity of $f_o$. It is believed that this lack of distinct choke resonance results from the uninhibited higher-order modes along the elongated peripheral path which is in large measure unaffected by the choke action since $\lambda g/\lambda$ is far from unity. The expected choke peak suppression at the operating frequency of x-directed modes is, therefore, masked. With the addition of the appropriate circuit parameter variations to establish a stop band for energy propagating in the y-direction, distinct evidence of choke action is revealed by curve C at the resonance point $f_o$, indicated by the numeral 140. It may also be noted that the minimum leakage at the $f_o$ point is approximately 20dB below the leakage of an unmodified choke door indicated by curve B. The frequency dependence has also been observed to be noncritical with only a 10dB degradation in choke performance for a ±200 MHz frequency deviation from choke resonance 140. As a result, electrical deviations during the life of an apparatus due to mechanical variations in embodiments of the present invention will certainly maintain satisfactory safety standards over extended periods of time.

It has also been noted in actual tests that the addition of the lossy energy absorbing bodies typically lowers the maximum leakage by another 10–15dB in unmodified doors whereas the addition of such material lowers the leakage by only 5–10dB with the door modified in accordance with the present invention. This data indicates that the door seal arrangement of the invention relies less on the additional lossy absorbing materials by reason of the inhibiting of higher-order mode energy propagation. The invention restores the normal function of the electrical choke arrangement in primarily controlling the TEM modes propagating in the x-direction across the peripheral gap. The data, therefore, indicates an improvement factor of 40–100 in reducing the leakage levels well below levels achieved with existing oven door arrangements.

A modification of the invention is disclosed in FIG. 11 wherein spaced slots 108 are now provided in wall 15. Choke arrangement 76 in this embodiment provides for the wall section 78 of panel member 62 to remain unmodified. The capacitive slots, therefore, are provided in wall 15 to result in the inhibition of the desired modes. The energy propagating in the y-direction coupled through slots 108 may be attenuated by suitable means within chamber 110 defined with case 16 by an end wall 111.

In FIG. 12 an alternative door seal arrangement is disclosed with choke 142 provided as a part of the enclosure wall 14 instead of the door assembly. The dielectric body 90 and transmission paths 80 and 88 are defined similar to the preceding embodiments. Panel member 144 and ring member 146 are fabricated as a single unit to define the overall door assembly 148 which contacts the wall choke arrangement. The choke wall portion 152 having the spaced capacitive slots 154 is secured by suitable means to oven wall member 14. The resultant door-choke arrangement is again provided around the access opening.

In the foregoing descriptions the inner and outer door window members 61 and 63 have been shown. It may also be noted that while a choke arrangement has been described, in certain embodiments of mode supporting structures the gaps between the door assembly and oven enclosure walls may be loaded with magnetized ferrite bodies to perturb the escaping energy. In such embodiments capacitive structures can be arranged in the oven enclosure walls in essentially the same manner shown in FIG. 11.

Other circuit parameter variation structures will now be described. In FIG. 14 slots 156 and 158 having varying lengths $c_1$ and $c_2$ provide substantially U-shaped members 160. In this embodiment one set of capacitive reactances can inhibit one frequency mode while the second set inhibits another frequency. In FIG. 15 slots 162 extend obliquely to define therebetween conductive members 164. In all the foregoing examples, the modification of the wall surfaces can be practiced for either the wall defining the enclosure or the door. In some embodiments both walls provide the requisite circuit variations.

In FIG. 16 a variation of the invention is disclosed with the corrugated wall 166 comprising a plurality of conductive rib sections 168 to provide alternating high and low impedance regions around the access opening. The ribs extend parallel to the x-direction or transverse across the elongated peripheral path. Dielectric material 170 is disposed in a similar manner to the previous embodiments. Spaced high impedance regions are defined by channels 172 between the rib sections 168 in the low impedance region. In this embodiment the x-direction extends in the direction indicated by the circle. The y-direction is again indicated perpendicular to this direction. A z-direction is also indicated showing the direction of energy into the choke filled with dielectric 170. In this embodiment further improvement in inhibiting modes may be realized by the provision of slots in the back walls of each channel as indicated by dashed lines 171.

FIG. 17 illustrates an aperiodically varied structure having somewhat random spacings with all the periods being much less than one effective electrical wavelength long, for example all less than $\lambda/4$ of the predetermined operating frequency. Hence, the distance between slots 174 and 176 provides a first spacing $p_1$. The distance between capacitive slots 176 and 178 provides a second spacing $p_2$. Similarly, the distance between slots 178 and 180 provides a third variable spacing. The conductive wall members disposed between the slots form varying spaced conductive members 182, 184 and 186.

FIG. 18 illustrates a choke arrangement 76 similar to that shown in FIGS. 4 and 5 modified by insertion of a dielectric or other desired material 107 in slots 106 to aid in achieving the desired circuit variations.

Figure 9:
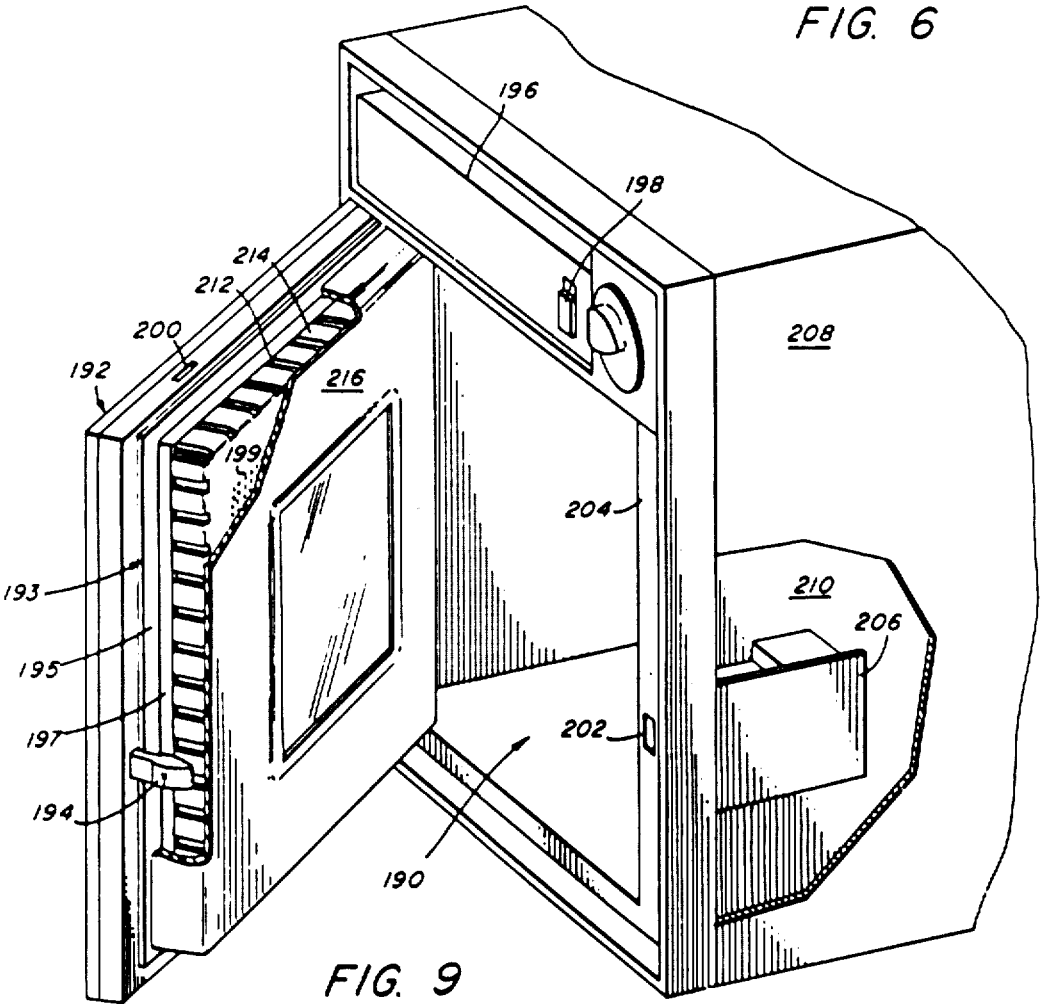
FIG. 9 is a perspective view of an illustrative apparatus having a side-hinged door seal arrangement.

An alternative heating apparatus of the side-hinged type is shown in FIG. 9. Access opening 190 is enclosed by means of door assembly 192 having a latch member 194. Control panel 196 includes a mechanical latching-interlock arrangement 198 which engages a slot 200 in the side wall of the door assembly. The latch member 194 engages slot 202 in peripheral wall 204 surrounding the access opening. Safety interlock switches are supported by plate 206 positioned between enclosure member wall 208 and the inner oven wall 210. Door assembly 192 is provided with a series of circuit variations to provide the desired inhibiting characteristics by slots 212 in the side wall of the door choke assembly to provide therebetween spaced conductive members 214. In this embodiment a cover 216, with a window of a plastic material, encases the inner wall portions of the door arrangement. The distribution of the circuit variations again follows the principle of the teachings of the invention as explained in detail with regard to the illustrations of the drop-down apparatus. A secondary absorbing seal is provided by any means such as, for example, a graphite loaded gasket 193 having a thicker section 195 adjacent to the choke dielectric material 197. The door assembly is completed by perforations 199 and in this embodiment the surface of wall 204 may be left uncovered by lossy gasket material to expose bare metal.

Figure 10:
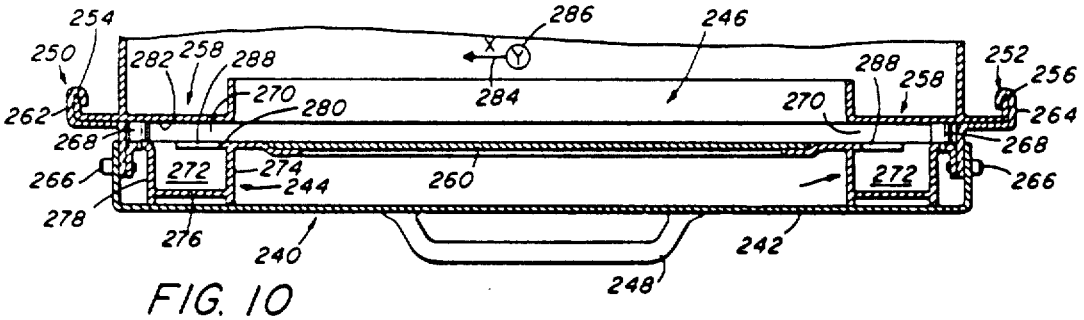
FIG. 10 is a cross-sectional view of a sliding door seal arrangement.

In FIG. 10 a slidably disposed door assembly 240 embodying the invention is illustrated comprising an outer skin member 242 of a metal, such as aluminum, wrapped around a frame 244 which may consist of sections of a metal channel seam-welded to form a picture frame-like structure to enclose access opening 246. Handle 248 is attached to the door assembly for manual operation. Track mechanisms 250 and 252 include nylon-bearing surfaces 254 and 256 inserted on the outer edge of a flange of the oven apparatus wall 258. Guide rails 262 and 264 are wrapped around this structure and are coupled between the outer skin member 242 and frame 244 by means of screws 266. Dielectric spacers 268 are inserted into the frame 244 and provide a gap 270. An inner skin member 260 of a suitable metal or other material encloses the inside of door frame 244 to reinforce the door.

Frame 244 defines a choke structure 272 having interior walls 274, 276, 278 and 280. Gap 270 as well as choke structure 272 may be filled with a dielectric material if desired. Wall 274 presents a terminating short circuit which reflects back to the point of origin of energy escaping through gap 270. Choke wall 280 and the opposing wall surface 282 of the oven wall 258 form a boundary of gap 270 which is effectively a mode supporting line. In this embodiment the x-direction in which the TEM-like modes are propagated is indicated by the arrow 284. The circle 286 indicates the y-direction of the modes to be suppressed and extends perpendicular to the x-direction. In accordance with the invention, choke wall 280 is appropriately modified by the provision of capacitive slots 288 having a major dimension extending normal to the y-direction of propagation. The foregoing embodiment may further be arranged with the choke structure 272 disposed within oven wall 258.

FIG. 13 illustrates a door arrangement 400 closing an opening in oven enclosure 402 defined by conductive walls 404. A frame 406 having perforations 408 and plastic window cover 410 is provided with an absorption cavity having walls 412 and 414 filled with a dielectric body 416. Energy escaping from enclosure 402 traverses the gap between wall 404 and wall 418 of the frame to first enter the absorption cavity. The energy path then extends right angularly along the front walls of the enclosure. An energy absorbing material 419 is disposed with a resilient wall member 420 adjacent the outer edge of the door. A trim moulding 422 and 424 completes the door assembly.

In accordance with the invention either wall 418 or opposing wall 404 is modified by slots 426. In this illustration these slots have been shown in wall 218. The dimensions are selected to inhibit propagation of energy in the peripheral elongated path designated by the circle 428 and y-direction while the x- or desired energy path is designated by arrow 430. All the variations previously described can also be embodied in this structure.

Figure 19:
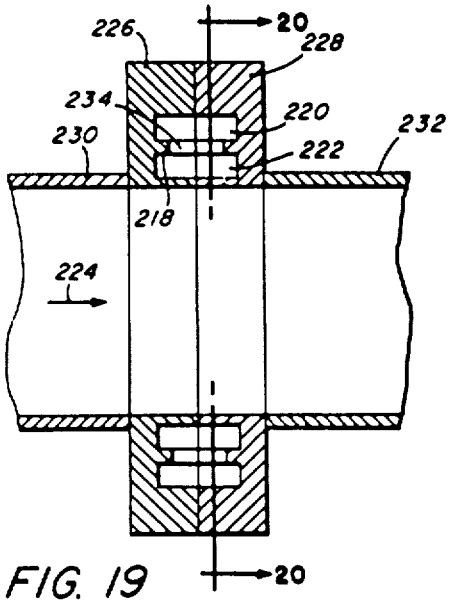
FIG. 19 is a partial cross-sectional view of an energy seal arrangement for use in alternative choke seal systems.
Figure 20:
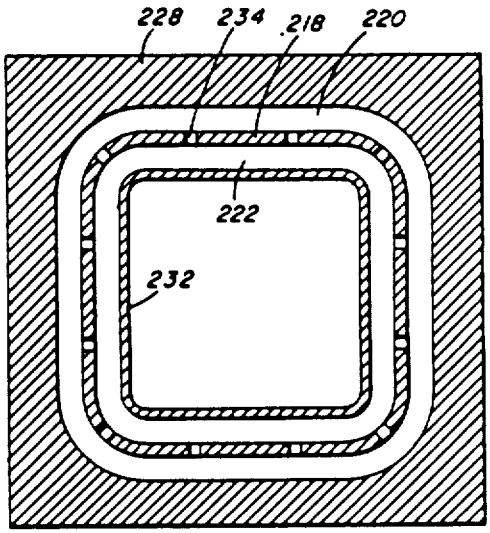
FIG. 20 is a vertical cross-sectional view taken on the line 20—20 in FIG. 19 looking in the direction of the arrows.

FIGS. 19 and 20 illustrate a waveguide transmission line capable of supporting numerous modes. Coupling flanges having a choke wall 218 provide two trough-like structures 220 and 222 within which transverse or oblique modes may be propagated while the direction of a described transmission is indicated by the arrow 224. Coupling flange members 226 and 228 couple waveguide sections 230 and 232. In this embodiment the circuit parameter variations are defined by slots 234 in choke wall 218. Again inhibition of peripherally directed propagating modes will result in a more efficient single mode transmission along the main line.

Figure 22:
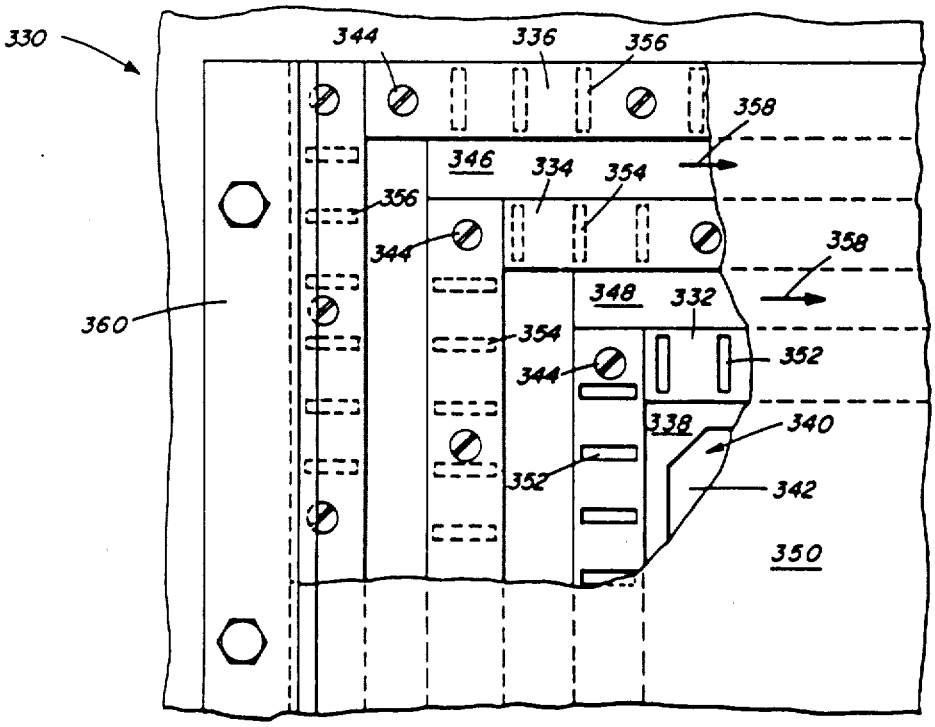
FIG. 22 is a partial elevational view of another embodiment of the type shown in FIG. 21.
Figure 21:
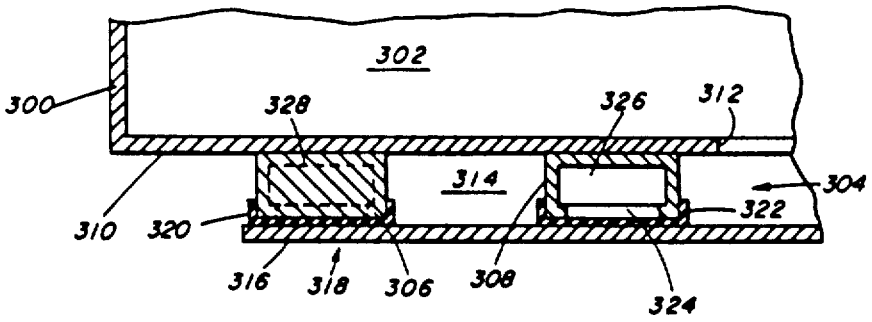
FIG. 21 is a partial cross-sectional view of an alternative energy seal arrangement.

FIGS. 21 and 22 illustrate another embodiment of a door seal arrangement providing an elongated propagation line comprising bars having widths of approximately one-quarter of a wavelength extending longitudinally or, what has hereinbefore been referred to as the y-direction, peripherally adjacent to the access opening walls with dielectric materials spaced between alternate bars. Each of the propagation lines are provided with a terminal end to reflect a low impedance at the point of energy origin. Explicit details regarding this embodiment may be had by referring to U.S. Pat. No. 3,511,959 issued May 12, 1970, to J. R. White.

In FIG. 21 the partial cross-sectional view discloses a conductive wall member 300 forming an oven enclosure 302. A mode supporting structure 304 includes first and second bar members 306 and 308 secured to surface 310 of the front conductive wall 300 around the access opening 312. The conductive bars are spaced apart to provide a space 314 of high impedance characteristics. Movable conductive panel 316 of door 318 provides a boundary wall member to form with wall surface 310, the structure 304 for transmission of energy having its origin adjacent the opening 312. Dielectric members 320 and 322, such as a polypropylene dielectric tape, prevents contact of bars 306 and 308 by the movable panel member 316. An alternately high and low impedance structure is defined with the low impedances provided in the regions of the conductive bars 306 and 308 and the intermediate section 314 defining a high impedance which can be approximately 60 times the characteristic impedances of the low impedance sections.

In this embodiment the conductive bars are modified in accordance with the invention to provide a series of capacitive slots 324 to inhibit the propagation of modes directed in a direction running parallel to the longitudinal bars peripherally around the access opening. In this view the direction of such undesired modes is viewed as propagating directly into the paper. To provide for the suppression of such energy, slots 324 communicate with chambers 326 provided by hollowing out conductive bar 308. The first conductive member 308 disclosed immediately adjacent to the access opening 312 may be the only modified structure or, if necessary for adequate energy control, the next conductive bar member 306 may be similarly modified, as indicated by dotted line 328.

Referring next to FIG. 22 an alternative door seal arrangement incorporating longitudinal bars extending adjacent to the periphery of an opening is shown. Door assembly 330 is slidably disposed by suitable means such as track members 360 attached to the oven front walls. A mode supporting structure having five sections is formed by three parallel spaced conductive bar members 332, 334 and 336 secured to surface 338 of a front wall 340 and extending peripherally around the access opening 342 by means of a nuts and bolts arrangement 344. Dielectric material members 346 and 348 are sandwiched between the conductive bar members and are secured by appropriate means. Each of the dielectric members is dimensioned to extend beyond the conductive bar members when the access door panel 350 is closed to prevent metal-to-metal contact.

Slots 352 are disposed, first, in the conductive bar member 332 peripherally around the access opening. After determination of the leakage value of escaping energy from the oven enclosure a second set of slots 354 may be required in bar member 334 to attenuate such energy. A third set of slots 356 in bar member 336 will assure the maximum protection against the leakage of electromagnetic energy around the door opening when the apparatus is operative. The foregoing slots are again arranged to inhibit the propagation of energy modes extending longitudinally and peripherally around the door opening in the direction indicated by the arrow 358. Alternatively, the foregoing embodiments can be fabricated with the modes supporting structures mounted directly on the movable door panels to contact the oven enclosure walls surrounding the access opening when the door assembly is in the closed position. In addition the slots may be provided in any desired manner on any desired wall. In the foregoing embodiments involving elongated bars it is also within the teachings of the invention to provide corrugated sections defining alternating spaces and conductive member ribs extending in the peripheral direction in accordance with the structure illustrated in FIG. 16.

The present invention affords a novel means for inhibiting initiation of modes propagating transversely or obliquely to a desired direction of energy propagation. The provision of a frequency stop band by circuit parameter variations inhibits propagation of modes in one direction at an operating frequency and provides for propagation of energy at this frequency in a different direction. In addition to high frequency heating apparatus, the invention is useful in systems including oversized waveguides supporting many modes, industrial conveyorized oven apparatus having elongated entrance and exit structures, transmission and communication systems. It is equally applicable to energy seals with and without choke arrangements. The invention may also be utilized in embodiments operating at more than one desired frequency.

Numerous variations or modifications of the disclosed invention will be evident to those skilled in the art. It is intended, therefore, that the foregoing description of the invention and the illustrative embodiments be considered in the broadest aspects and not in a limiting sense.

We claim:

[1. Heating apparatus comprising:

an enclosure;

means for energizing said enclosure with energy having at least a predetermined frequency;

said enclosure comprising at least a wall member having an access opening and a closure member for said access opening; and an energy seal comprising at least portions of said wall and closure members to define an elongated energy mode supporting structure;

said mode supporting structure comprising means for substantially inhibiting the propagation of energy at said frequency in one direction and substantially providing for propagation of said energy in a different direction.]

[2. The apparatus according to claim 1 wherein said propagating inhibiting and provision means comprise structural variations to provide points of maximum and adjacent points of minimum variation in the energy propagating characteristics along at least a portion of said mode supporting structure.]

[3. The apparatus according to claim 2 wherein the distance between points of maximum variation and adjacent points of minimum variation are less than one effective electrical wavelength of said frequency of energy within said enclosure.]

[4. The apparatus according to claim 2 wherein at least some of said structural variations are periodic.]

5. [The apparatus according to claim 2 wherein at least some of said structural variations are aperiodic] *Heating apparatus comprising:*

*an enclosure;*

*means for energizing said enclosure with energy having at least a predetermined frequency and a plurality of modes;*

*said enclosure comprising at least a wall member having an access opening and a door for said access opening;*

*an energy seal comprising at least portions of said wall and door to define an elongated energy mode supporting structure;*

*said mode supporting structure comprising means for directing substantially all energy propagation entering said seal in a first direction outwardly across said mode supporting structure and means for substantially inhibiting the propagation of said energy at said frequency in directions perpendicular and oblique to said first direction; and*

*said propagation inhibiting and directing means comprising aperiodic structural variations along at least a portion of said mode supporting structure.*

[6. The apparatus according to claim 2 wherein said structural variations are produced by means comprising slots.]

[7. The apparatus according to claim 2 wherein said structural have a major dimension extending normal to the direction of energy propagating along said structure.]

8. [The heating apparatus according to claim 6 wherein] *Heating apparatus comprising:*

*an enclosure;*

*means for energizing said enclosure with energy having at least a predetermined frequency;*

*said enclosure comprising at least a wall member having an access opening and door for said access opening;*

*an energy seal comprising at least portions of said wall and door to define an elongated energy mode supporting structure;*

*said mode supporting structure comprising means for directing substantially all energy propagation entering said seal in a first direction outwardly across said mode supporting structure and means for substantially inhibiting the propagation of energy at said frequency in directions perpendicular and oblique to said first direction;*

*said propagation inhibiting and directing means comprising structural variations along at least a portion of said mode supporting structure;*

*said structural variations being produced by means comprising slots; and* at least some of said slots have a different length.

[9. The apparatus according to claim 2 wherein one of said energy seal wall members is movable.]

[10. The apparatus according to claim 1 and means coupled to said mode supporting structure for dissipating energy transmitted therethrough.]

[11. Heating apparatus comprising:

an enclosure;

means for energizing said enclosure with energy having at least a predetermined frequency;

means for producing a plurality of energy modes within said enclosure in a cyclically varying manner;

said enclosure comprising at least a wall member having an access opening and a closure member for said access opening; and an energy seal comprising at least portions of said wall and closure members to define an elongated energy mode supporting structure;

said mode supporting structure comprising means for substantially inhibiting the propagation of energy at said frequency in one direction and substantially providing for propagation of said energy in a different direction.]

[12. The apparatus according to claim 11 wherein said propagation inhibiting and provision means comprise structural variations to provide points of maximum and adjacent points of minimum variation in the energy propagation characteristics along at least a portion of said mode supporting structure.]

[13. The apparatus according to claim 12 wherein the distance between points of maximum variation and adjacent points of minimum variation are less than one effective electrical wavelength of said frequency within said enclosure.]

[14. The apparatus according to claim 11 wherein at least some of said structural variations are periodic.]

[15. The apparatus according to claim 11 wherein at least some of said structural variations are aperiodic.]

[16. The apparatus according to claim 11 wherein said structural variations are produced by means comprising slots.]

[17. The apparatus according to claim 11 wherein said structural variations have a major dimension extending normal to the direction of energy propagating along said mode supporting structure.]

[18. The apparatus according to claim 16 wherein at least some of said slots have a different length.]

[19. The apparatus according to claim 11 wherein one of said energy seal wall members is movable.]

[20. The apparatus according to claim 11 and means coupled to said mode supporting structure for dissipating energy transmitted therethrough.]

[21. In combination:

a cavity;

means for supplying said cavity with electromagnetic wave energy in a frequency range where the dimensions of said cavity are substantially greater than a free space wavelength at said frequency;

access means to said cavity comprising a door for closing an opening in a wall of said cavity; and means for providing an energy seal between said door and said cavity wall comprising an elongated energy mode supporting structure;

said mode supporting structure comprising means for substantially inhibiting the excitation of predetermined modes of electromagnetic energy at said frequency peripherally along said structure and substantially providing for the propagation of predetermined modes of said energy across said structure.]

[22. The combination in accordance with claim 2 wherein said excitation inhibiting and provision means comprise structural variations to provide alternately a maximum and a minimum point in the energy propagating characteristics of said structure.]

[23. The combination in accordance with claim 22 wherein the distance between points of maximum variation and adjacent points of minimum variation are less than one effective electrical wavelength of said frequency.]

[24. The combination in accordance with claim 23 wherein said structure comprises a dielectric medium.]

[25. The combination in accordance with claim 24 wherein said structure comprises metallic bounding surfaces.]

[26. The combination in accordance with claim 25 wherein said bounding surfaces defining said mode supporting structure are separated by said dielectric medium.]

[27. The combination in accordance with claim 26 wherein a medium is provided adjacent said opening for dissipating radiated energy escaping across said structure.]

[28. Heating apparatus comprising:

an enclosure;

means for energizing said enclosure with energy having a predetermined frequency;

said enclosure having an access opening;

a member for closing said opening; and elongated energy mode supporting structure comprising a choke disposed adjacent to at least one peripheral wall of said opening;

said mode supporting structure comprising structural variations to yield predetermined maximum and minimum points to control the energy propagating characteristics in predetermined directions within said structure.]

[29. The apparatus according to claim 28 wherein said choke and mode supporting structure are filled with a dielectric medium.]

[30. The apparatus according to claim 28 wherein said choke is disposed along at least portions of the peripheral edges of said closure member.]

[31. The apparatus according to claim 28 wherein said choke is disposed within at least portions of one peripheral wall of said opening.]

[32. The apparatus according to claim 28 wherein at least some of said structural variations are periodic.]

[33. The apparatus according to claim 28 wherein at least some of said structural variations are aperiodic.]

[34. The apparatus according to claim 28 wherein the distance between points of maximum variation and adjacent points of minimum variation are less than one effective electrical wavelength of said frequency of energy within said enclosure.]

[35. The apparatus according to claim 28 and means for producing a plurality of modes within said enclosure in a cyclically varying manner.]

[36. The apparatus according to claim 28 and means coupled to said mode supporting structure for dissipating energy escaping from said line.]

[37. Heating apparatus comprising:

a source of microwave energy;

means for concentrating energy from said source in a restricted region of space comprising a wall member having an access opening;

the maximum linear dimension of said space being at least a plurality or free space wavelengths of the predominant frequency band of said energy and the periphery of said access opening being greater than a plurality of free space wavelengths of said energy;

means for substantially preventing the escape of said energy from said region through said opening comprising means for producing substantially standing waves from any portions of said energy which pass through said opening and a plurality of frequency responsive means spaced around at least a major portion of said opening for providing impedance variations to transmission of said energy around the periphery of said opening;

the average spacing between the maxima and/or minima of said impedance variations at said frequency being less than one-half of a free space wavelength of said frequency.]

[38. The apparatus according to claim 37 wherein said means for preventing the loss of said energy through said opening comprises a member for closing said opening.]

[39. The apparatus according to claim 37 and secondary means for preventing the escape of said energy comprising a lossy energy absorbing material disposed adjacent to said opening.]

[40. The apparatus according to claim 37 wherein said means for providing impedance variations comprises spaced impedance discontinuities.]

[41. the apparatus according to claim 40 wherein said impedance discontinuities comprise spaced slots extending in a direction substantially perpendicular to the periphery of said opening.]

[42. The apparatus according to claim 40 wherein said impedance discontinuities comprise spaced slots extending obliquely to the periphery of said opening.]

[43. The apparatus according to claim 40 wherein said impedance discontinuities extend in a direction perpendicular to the periphery of said opening for a distance substantially equal to a quarter wavelength of said standing waves.]

[44. The apparatus according to claim 37 wherein said means for producing said standing waves comprises a substantially short circuit electrically spaced from said wall member by a distance substantially equal to one or more half wavelengths of said standing waves.]

[45. The apparatus according to claim 38 wherein said means for providing said standing waves comprises a mode supporting structure made up at least in part of portions of said wall member and portions of said closure member.]

[46. The apparatus according to claim 45 wherein said impedance variations extend around at least a major portion of at least one peripheral wall of said mode supporting structure.]

[47. The apparatus according to claim 45 wherein said mode supporting structure comprises an input section communicating with said restricted region and having said means for producing said impedance variations and a section outside said input section for reflecting an impedance which is substantially less than the average characteristic impedance of said input section.]

[48. The apparatus according to claim 37 wherein said wall member is a portion of a conductive enclosure surrounding said region and said means for preventing the escape of said energy through said opening comprises a conductive closure member covering said opening and spaced from said wall member by a dielectric medium forming a mode supporting structure having at least an input section and a choke section and said means for providing impedance variations comprise a plurality of impedance discontinuities in the input section of said mode supporting structure spaced along a major portion of the periphery of said opening with the average of said spacing being less than one-half of a free space wavelength of said frequency.]

49. [The apparatus according to claim 48] *Heating apparatus comprising:*

*a source of microwave energy;*

*means for concentrating energy from said source in a restricted region of space comprising a wall member having an access opening;*

*the maximum linear dimension of said space being at least a plurality of free space wavelengths of the predominant frequency band of said energy and the periphery of said access opening being greater than a plurality of free space wavelengths of said energy;*

*means for substantially preventing the escape of said energy from said region through said opening comprising means for producing substantially standing waves from any portions of said energy which pass through said opening and a plurality of frequency responsive means spaced around at least a major portion of said opening for providing impedance variations to transmission of said energy around the periphery of said opening;*

*the average spacing between the maxima and/or minima of said impedance variations at said frequency being less than one-half of a free space wavelength of said frequency;*

*said wall member being a portion of a conductive enclosure surrounding said region and said means for preventing the escape of said energy through said opening comprises a conductive closure member covering said opening and spaced from said wall member by a dielectric medium forming a mode supporting structure having at least an input section and a choke section and said means for providing impedance variations*

*comprising a plurality of impedance discontinuities in the input section of said mode supporting structure spaced along a major portion of the periphery of said opening with the average of said spacing being less than one-half of a free space wavelength of said frequency; and,* wherein said input and choke sections are separated by a common wall and said spaced impedance discontinuities are disposed in said common wall.

[50. The apparatus according to claim 48 and secondary means for preventing the escape of said energy comprising a lossy energy absorbing material coupled to the output portion of said mode supporting structure.]

[51. Heating apparatus comprising:

an enclosure;

means for energizing said enclosure with energy having a predetermined frequency;

said enclosure comprising a wall member having an access opening and a closure member for said access opening; and an energy seal comprising at least portions of said wall and closure members spaced from one another by a dielectric medium;

said energy seal further comprising a plurality of spaced slots extending in a direction substantially perpendicular to the periphery of said opening and defining therebetween conductive elements;

the average spacing between said slots being less than one-half of a free space wavelength of said frequency.]

[52. The apparatus according to claim 51 wherein said spaced slots are disposed along at least portions of the peripheral edges of said closure member.]

[53. The apparatus according to claim 51 wherein said spaced slots are disposed along at least portions of one peripheral wall of said opening.]

[54. Heating apparatus comprising:

an enclosure;

means for energizing said enclosure with energy having a predetermined frequency;

said enclosure comprising a wall member having an access opening and a closure member for said opening; and an energy seal comprising an input section and a choke section made up of at least portions of said wall and closure members spaced from one another by a dielectric medium;

said energy seal further comprising a plurality of spaced slots extending in a direction substantially perpendicular to the periphery of said opening and defining therebetween conductive elements;

said elements all having one end interconnected and the other ends terminating in a dielectric medium;

the average spacing between said slots being less than one-half a free space wavelength of said frequency.]

55. [The apparatus according to claim 54] *Heating apparatus comprising:*

*an enclosure;*

*means for energizing said enclosure with energy having a predetermined frequency;*

*said enclosure comprising a wall member having an access opening and a closure member for said opening;*

*an energy seal comprising an input section and a choke section made up of at least portions of said wall and closure members spaced from one another by a dielectric medium;*

*said energy seal further comprising a plurality of spaced slots extending in a direction substantially perpendicular to the periphery of said opening and defining therebetween conductive elements;*

*said elements all having one end interconnected and the other ends terminating in a dielectric medium;*

*the average spacing between said slots being less than one-half of a free space wavelength of said frequency; and* wherein said input and choke sections are separated by a common wall and said spaced slots are disposed in said common wall.

56. The apparatus according to claim [54] *55* wherein said choke section is disposed along at least portions of one peripheral wall of said opening.

57. The apparatus according to claim [54] *55* wherein said choke section is disposed along at least portions of one peripheral wall of said closure member.

*58. Heating apparatus comprising:*

*an enclosure;*

*means for energizing said enclosure with energy having a frequency in a predominant frequency band;*

*the sum of the linear dimensions of said enclosure being at least a plurality of free space wavelengths of said frequency;*

*an access aperture in a wall of said enclosure;*

*a door for closing said access aperture;*

*a microwave energy seal having conductive portions of said wall and said door forming an elongated energy mode supporting structure comprising a reentrant choke structure having a common wall with an input transmission line structure, said common wall being substantially less than a quarter wavelength in thickness at said predetermined frequency; and*

*said common wall containing slots which inhibit the propagation of said energy in directions in said seal perpendicular and oblique to an outward direction and direct the propagation of said energy from the interior of said enclosure in said outward direction to said reentrant choke structure substantially only through said input transmission line structure.*

*59. Heating apparatus comprising:*

*an enclosure;*

*means for energizing said enclosure with energy having at least a predetermined frequency and a plurality of modes;*

*said enclosure comprising at least a wall member having an access opening and a door for said access opening; and*

*an energy seal comprising at least portions of said wall and door to define an elongated energy mode supporting structure;*

*said mode supporting structure comprising means for directing substantially all energy propagation entering said seal in a first direction outwardly across said mode supporting structure and means for substantially inhibiting the propagation of energy at said frequency in directions perpendicular and oblique to said first direction;*

*said propagation inhibiting and directing means comprising slots in said mode supporting structure, said slots being arrayed in said perpendicular direction and extending in said first direction.*

*60. Heating apparatus comprising:*

*an enclosure;*

*means for energizing said enclosure with energy having at least a predetermined frequency and a plurality of modes;*

*said enclosure comprising at least a wall member having an access opening and a door for said access opening;*

*an energy seal comprising at least portions of said wall and door to define an elongated energy mode supporting structure;*

*said mode supporting structure comprising means for directing substantially all energy propagation entering said seal in a first direction outwardly across said mode supporting structure and means for substantially inhibiting the propagation of said energy at said frequency in directions perpendicular and oblique to said first direction; and*

*said structural variations are produced by means comprising spaced slots extending obliquely to said perpendicular direction.*

*61. A microwave oven comprising:*

*a conductive enclosure having an access aperture;*

*a door for closing said access aperture;*

*means for supplying microwave energy predominantly in a predetermined band to said enclosure;*

*means for cyclically varying the mode pattern within said enclosure;*

*the linear dimensions of said enclosure being substantially greater than the free space wavelength of said energy;*

*a microwave seal comprising portions of a wall of said conductive enclosure and said door;*

*said seal comprising an input transmission line section disposed between the interior of said enclosure and a choke section with means comprising slots in a conductive wall of said input transmission line section for directing substantially all of said energy propagation in a single direction outwardly toward said choke section which reflects said energy back through said input section into said enclosure and for inhibiting the propagation of energy in said frequency band in directions perpendicular and oblique to said single direction; and*

*means for providing that all energy entering said seal enters through said input transmission line section.*

*62. A microwave oven comprising:*

*a conductive enclosure supplied with microwave energy predominantly in a predetermined band;*

*said enclosure having an access aperture whose linear dimensions are substantially greater than the free space wavelength of said energy;*

*a door for closing said access aperture;*

*means for cyclically varying the mode pattern within said enclosure;*

*a microwave seal comprising conductive portions of said enclosure and said door;*

*said seal comprising an input transmission line section interconnecting the interior of said enclosure and a choke section; and*

*means comprising slots in a conductive wall of said choke section for restricting propagation in said choke section to a TEM-like mode.*

*63. A microwave oven comprising:*

*a conductive enclosure having an access aperture;*

*a door for closing said access aperture;*

*means for supplying said enclosure with microwave energy predominantly in a predetermined frequency band;*

*means for cyclically varying the mode pattern within said enclosure;*

*the linear dimensions of said enclosure being substantially greater than the free space wavelength of said energy;*

*a microwave seal comprising portions of a wall of said conductive enclosure and said door; and*

*said seal comprising an input transmission line section coupling the interior of said enclosure with a choke section with means comprising slots in a conductive wall of said input transmission line section for directing substantially all of said energy propagation in a single direction outwardly toward said choke section which reflects said energy back through said input section into said enclosure and for inhibiting the propagation of energy in said frequency band in directions perpendicular and oblique to said direction, the input transmission line section comprising portions of said wall and said door which form parallel elongated planar structures and which limit energy propagation to said choke section to the space between said planar structures.*

*64. A microwave oven comprising:*

*a conductive enclosure having an access aperture;*

*a door for closing said access aperture;*

*means for supplying microwave energy perdominantly in a predetermined band to said enclosure;*

*means for cyclically varying the mode pattern within said enclosure;*

*the sum of the linear dimensions of said enclosure and said aperture being substantially greater than the free space wavelength of said energy;*

*a microwave seal comprising portions of a wall of said conductive enclosure and said door extending around the periphery of said access aperture;*

*said seal comprising an input transmission line section coupled between the interior of said enclosure and a choke section;*

*means for providing that all energy entering said seal enters through said input transmission line section; and*

*means comprising a slotted common wall of said input transmission line section and said choke section for coupling to said choke section substantially all of said energy in said input transmission line section directed generally orthogonally to the periphery of said access aperture while inhibiting the propagation of said energy in the peripheral and oblique directions of said access aperture.*

*65. A microwave oven comprising:*

*a conductive enclosure having an access aperture;*

*a door for closing said access aperture;*

*means for supplying said enclosure with microwave energy predominantly in a predetermined band to said enclosure;*

*means for cyclically varying the mode pattern within said enclosure;*

*the linear dimensions of said enclosure being substantially greater than the free space wavelength of said energy;*

*a microwave seal including portions of a wall of said conductive enclosure and said door;*

*said seal comprising an input transmission line section disposed between the interior of said enclosure and a choke section with means comprising slots in a conductive wall of said input transmission line section for substantially restricting energy propagation in the input transmission line section to a TEM-like mode directed toward said choke section whereby said energy propagation is blocked by said choke section; and*

*means for providing that all energy entering said seal enters through said input transmission line section.*

*66. Heating apparatus comprising:*

*an enclosure;*

*means for energizing said enclosure with energy having at least a predetermined frequency and a plurality of modes;*

*said enclosure comprising at least a wall member having an access opening and a door for said access opening; and*

*an energy seal comprising at least portions of said wall and door to define an elongated energy mode supporting structure;*

*said mode supporting structure comprising means for directing substantially all energy propagation entering said energy seal in a first direction outwardly across said mode supporting structure and for substantially inhibiting the propagation of said energy at said frequency in directions perpendicular and oblique to said first direction.*

*67. The apparatus according to claim 66 wherein said propagation directing and inhibiting means comprises structural variations to provide points of maximum and adjacent points of minimum variation in the energy propagating characteristics along at least a portion of said mode supporting structure.*

*68. The apparatus according to claim 67 wherein the distance between points of maximum variation and adjacent points of minimum variation are less than one effective electrical wavelength of said frequency of energy within said enclosure.*

*69. The apparatus according to claim 67 wherein at least some of said structural variations are periodic.*

*70. The apparatus according to claim 67 wherein said structural variations are produced by means comprising slots.*

*71. The apparatus according to claim 67 wherein said structural variations have a major dimension extending normal to the direction of energy propagating along said structure.*

*72. The apparatus according to claim 67 wherein one of said energy seal wall members is movable.*

*73. The apparatus according to claim 66 and means coupled to said mode supporting structure for dissipating energy transmitted therethrough.*

*74. The apparatus according to claim 66 wherein said plurality of energy modes are produced in a cyclically varying manner.*

*75. Heating apparatus comprising:*

*an enclosure;*

*means for energizing said enclosure with energy having a predetermined frequency and a plurality of modes;*

*said enclosure having an access opening;*

*a door for closing said opening; and*

*elongated energy mode supporting structure comprising an elongated choke disposed adjacent to at least one peripheral wall of said opening;*

*said mode supporting structure comprising means for directing substantially all energy propagation outwardly in a first direction to the mouth of said choke and for substantially inhibiting the propagation of energy at said frequency in directions perpendicular and oblique to said first direction, said propagation inhibiting and directing means comprising structural variations arranged in a direction perpendicular to said first direction.*

*76. The apparatus according to claim 75 wherein said choke and mode supporting structure are filled with a dielectric medium.*

*77. The apparatus according to claim 75 wherein said choke is disposed along at least portions of the peripheral edges of said closure member.*

*78. The apparatus according to claim 75 wherein said choke is disposed within at least portions of one peripheral wall of said opening.*

*79. The apparatus according to claim 75 wherein at least some of said structural variations are periodic.*

*80. The apparatus according to claim 75 and means coupled to said mode supporting structure for dissipating energy escaping across said structure.*

*81. A microwave oven comprising:*

*a conductive enclosure having an access aperture;*

*a door for closing and opening said access aperture;*

*means for supplying microwave energy predominantly in a predetermined band to said enclosure;*

*means for cyclically varying the mode pattern within said enclosure;*

*the sum of the linear dimensions of said enclosure being substantially greater than the free space wavelength of said energy;*

*a microwave seal comprising portions of a wall of said conductive enclosure and said door;*

*said seal comprising an input transmission line section coupled between the interior of said enclosure and a choke section; and*

*means in a wall common to said input transmission line section and said choke section for directing the propagation of substantially all of said energy in said frequency band entering said seal in a single direction across said choke section and for inhibiting the propagation of energy entering said seal in directions perpendicular and oblique to said single direction.*

*82. An oven comprising:*

*an enclosure;*

*means for energizing said enclosure with energy having a frequency in a predominant frequency band;*

*the sum of the maximum linear dimensions of said enclosure being at least a plurality of free space wavelengths of said frequency;*

*an access aperture in a wall of said enclosure;*

*a door for closing said access aperture and forming a microwave energy seal with said wall at said frequency band around the periphery of said aperture;*

*said seal comprising an input transmission line section coupled between the interior of said enclosure and a reentrant choke section which provides for the propagation of substantially all of said energy in said frequency band in a direction generally orthogonal to said periphery from the interior of said enclosure substantially only through said transmission line structure to said reentrant choke structure while inhibiting the propagation of waves of said energy in said frequency band in directions perpendicular and oblique to said orthogonal direction.*

*83. A microwave oven comprising:*

*a conductive enclosure having an access aperture;*

*a door for closing said access aperture;*

*means for supplying microwave energy predominantly in a predetermined band to said enclosure;*

*means for cyclically varying the mode pattern within said enclosure;*

*the sum of the linear dimensions of said enclosure being substantially greater than the free space wavelength of said energy;*

*a microwave seal comprising portions of the wall of said conductive enclosure around said aperture and conductive portions of said door; and*

*said seal comprising an input transmission line section, a choke section and an output transmission line section connected at a common junction;*

*said common junction being coupled to the interior of said enclosure substantially only through said input transmission line section; and*

*said seal comprising means in a thin conductive wall common to said input and choke sections for permitting the propagation of waves of said energy entering said seal in an outward direction toward said choke section and for inhibiting the propagation of waves of said energy in said frequency band in directions perpendicular and oblique to said outward direction.*

*84. A microwave oven comprising:*

*a conductive enclosure having an access aperture;*

*a door for closing said access aperture;*

*means for supplying microwave energy predominantly in a predetermined band to said enclosure;*

*means for cyclically varying the mode pattern within said enclosure;*

*the sum of the linear dimensions of said enclosure and said aperture being substantially greater than the free space wavelength of said energy;*

*a microwave seal comprising portions of a wall of said conductive enclosure and said door around the periphery of said access aperture;*

*said seal comprising an input transmission line section coupled between the interior of said enclosure and a choke section;*

*means for providing that all energy entering said seal enters through said input transmission line section; and*

*means comprising an apertured common wall of said input transmission line section and said choke section for coupling to said choke section substantially all of said energy in said input transmission line section directed generally orthogonally to the periphery of said access aperture while inhibiting the propagation of said energy in the peripheral and oblique directions.*

*85. Microwave heating apparatus comprising:*

*an enclosure;*

*means for energizing said enclosure with energy having a frequency in a predominant frequency band;*

*an access aperture in a wall of said enclosure;*

*the sum of the linear dimensions of said enclosure and said aperture being at least a plurality of free space wavelengths at said frequency;*

*a door for closing said access aperture;*

*a microwave energy seal between said wall and door comprising adjacent conductive portions of said wall and closure members;*

*said seal comprising a choke section and an input transmission line section having a thin conductive wall which is common to both sections and which contains means for providing for the coupling of energy entering said seal from the interior of said enclosure in an outward direction toward said choke section through said input transmission line structure while inhibiting the propagation of said energy in directions perpendicular and oblique to said outward direction, said adjacent conductive portions forming parallel elongated planar structures with means limiting access to said choke section to the space between said planar structures.*

*86. A microwave oven comprising:*

*a conductive enclosure supplied with microwave energy predominantly in a predetermined band;*

*said enclosure having an access aperture whose linear dimensions are substantially greater than the free space wavelength of said energy;*

*a door for closing said access aperture;*

*means for cyclically varying the mode pattern within said enclosure;*

*a microwave seal comprising conductive portions of said enclosure and said door;*

*said seal comprising an input transmission line section interconnecting the interior of said enclosure and a choke section; and*

*means in a conductive wall of said choke section for restricting propagation in said choke section to a TEM-like mode and thereby inhibiting the propagation of other modes having propagation components around the periphery of said access aperture.*

*87. A microwave oven comprising:*

*a conductive enclosure having an access aperture;*

*a door for closing said access aperture;*

*means for supplying microwave energy predominantly in a predetermined band to said enclosure;*

*means for cyclically varying the mode pattern within said enclosure;*

*the linear dimensions of said enclosure being substantially greater than the free space wavelength of said energy;*

*a microwave seal comprising portions of a wall of said conductive enclosure and said door;*

*said seal comprising an input transmission line section disposed between the interior of said enclosure and a choke section with means in a conductive wall of said input transmission line section for substantially restricting said energy propagation to a TEM-like mode directed toward said choke section whereby said energy propagation is blocked by said choke section; and*

*means for providing that all energy entering said seal enters through said input transmission line section.*

*88. Heating apparatus comprising:*

*an enclosure;*

*means for energizing said enclosure with energy having a frequency in a predominant frequency band;*

*the sum of the linear dimensions of said enclosure being at least a plurality of free space wavelengths of said frequency;*

*an access aperture in a wall of said enclosure;*

*a door for closing said access aperture;*

*a microwave energy seal having conductive portions of said wall and said door forming an elongated energy mode supporting structure comprising a reentrant choke structure having a common wall with an input transmission line structure, said common wall being substantially less than a quarter wavelength in thickness at said predetermined frequency; and*

*said common wall containing slots oriented in an outward-pointing direction and spaced from each other in a direction perpendicular to the outward-pointing direction.*

*89. Heating apparatus comprising:*

*an enclosure;*

*means for energizing said enclosure with energy having at least a predetermined frequency and a plurality of modes;*

*said enclosure comprising at least a wall member having an access opening and a door for said access opening;*

*an energy seal comprising at least portions of said wall and door to define an elongated energy mode supporting structure; and*

*said mode supporting structure comprising slots in at least one of said wall and said door, the slots being arrayed in a peripheral direction around the access opening and extending in the outward-pointing direction, the extent of the slots in the direction perpendicular to both the peripheral direction and the outward-pointing direction being substantially less than a quarter wavelength at said predetermined frequency.*

*90. A microwave oven comprising:*

*a conductive enclosure supplied with microwave energy predominantly in a predetermined band;*

*said enclosure having an access aperture whose linear dimensions are substantially greater than the free space wavelength of said energy;*

*a door for closing said access aperture;*

*means for cyclically varying the mode pattern within said enclosure;*

*a microwave seal comprising conductive portions of said enclosure and said door;*

*said seal comprising an input transmission line section interconnecting the interior of said enclosure and a choke section at least in part bounded by a conductive wall, said conductive wall being substantially less than a quarter wavelength in thickness at said predetermined frequency; and*

*a plurality of slots in said conductive wall of said choke section, the slots being arrayed in a peripheral direction around the access opening and extending in the outward-pointing direction.*

*91. A microwave oven comprising:*

*a conductive enclosure having an access aperture;*

*a door for closing said access aperture;*

*means for supplying with microwave energy predominantly in a predetermined band to said enclosure;*

*means for cyclically varying the mode pattern within said enclosure;*

*the linear dimensions of said enclosure being substantially greater than the free space wavelength of said energy;*

*a microwave seal comprising portions of a wall of said conductive enclosure and said door; and*

*said seal comprising an input transmission line section disposed between the interior of said enclosure and a choke section, with a plurality of slots in a conductive wall of said input transmission line section, said conductive wall being substantially less than a quarter wavelength in thickness at said predetermined frequency, and the slots being arrayed in a peripheral direction around the access opening and extending in the outward-pointing direction.*

*92. Heating apparatus comprising:*

*an enclosure;*

*means for energizing said enclosure with energy having a frequency in a predominant frequency band;*

*the sum of the linear dimensions of said enclosure being at least a plurality of free space wavelengths of said frequency;*

*an access aperture in a wall of said enclosure;*

*a door for closing said access aperture;*

*a microwave energy seal having conductive portions of said wall and said door forming an elongated energy mode supporting structure comprising an input transmission line structure and a reentrant choke structure, the input transmission line structure and the choke structure sharing a conductive wall in common, said conductive wall being substantially less than a quarter wavelength in thickness at said predetermined frequency; and*

*said common wall containing a plurality of slots arrayed in spaced apart relationship in the peripheral direction around the access opening and extending in the outward-pointing direction.*

• • • • •